Patented Apr. 26, 1927.

1,626,577

UNITED STATES PATENT OFFICE.

LON EDWARD WELCH, OF MEMPHIS, TENNESSEE.

ARTIFICIAL STONE OR MARBLE.

No Drawing.   Application filed August 17, 1926. Serial No. 129,863.

The present invention relates to the production of a new and improved tile, artificial stone or composition of matter suitable for use for ornamental and structural purposes both in inside and outside work as well as use in forming various articles of manufacture such as bath tubs, wash basins, bath room floors, refrigerator linings and walls, all kinds of ornaments, wall board, etc.

The composition of matter forming the subject matter of the present invention is substantially water proof or absorbs very little water in comparison with ordinary cement which absorbs about ten times as much water as the present composition. It is highly fire resistant and when the proper amount of asbestos is added, as indicated below, it can be made so highly fire resistant that a blow torch can be applied to it for thirty minutes without any visible injury to the material. The composition is very durable, showing under the test of friction machines a much greater durability than natural stones. It is substantially a non-conductor of heat, cold and electricity; is much lighter than stone, but has a higher crushing point, its normal weight being capable of being greatly lessened by the use of cork dust instead of sawdust as hereinafter described.

The composition has a beauty peculiarly its own, but when a proper amount of wax is added during its preparation, it has the most beautiful surface gloss, very similar to the finest and most beautiful marble; and this gloss is not lost as the material wears away, but continues throughout the whole life of the material. The composition can also be manufactured in dull finish and can be made in the most quiet and restful tones.

The invention provides a material which does not expand or contract to any perceptible or appreciable degree by reason of heat or cold and it is, therefore, suitable for use in practically any climate since it is also substantially water proof as heretofore mentioned. The material produced by the present invention can be sawed or nailed with almost the same ease as wood, but does not decay as is the case with wood. The ordinary manner of applying the material or composition on side walls and ceilings is by nailing, the nails being countersunk and the nail holes being filled with the pointing composition, hereinafter described, so as to conceal all signs of being nailed and to present a perfectly solid surface. Another great advantage which the material offers is the great economy with which it can be applied. It requires neither stone masons nor experts to apply it, but any ordinary workman skilled in the use of a saw and a hammer can apply the material or composition in a most satisfactory manner.

The composition does not warp, and is rat and insect proof.

Another desirable property of the composition is that as it slowly wears away through the years, it always maintains the same beauty, either dull or polished, that it had at the outset.

The setting or hardening of the composition will take place at a temperature of 75° F. within twelve hours, which fact renders this process much quicker and simpler than any other process for manufacturing a composition for similar uses and having similar properties.

The composition can be manufactured at a very low cost, and can be sold for decorative purposes at less than one third the cost of marble, which it most nearly resembles in its polished form. The material is self polishing and does not require the work of stone cutters or polishers to put it in artistic form. For floor tiles, side walls, etc., it can compete in price with ordinary clay tiles, which cannot be compared with it in beauty nor in the wide variety of useful purposes.

The composition is unusually strong, breaking much less easily than stone, tile and other building material. It can be handled, therefore, with much less care than is required for the aforementioned products and more delicate materials. Slabs of the composition can be dropped on hard floors without any material danger of breaking. Because of this low frangibility and the light weight of the material it can be shipped with much less expense than ordinary building materials used for similar purposes.

The composition has acoustic properties equal or superior to any other known construction material, and therefore is ideal for use on side walls and ceilings of public halls, auditoriums, etc.

The material or composition is one of universal application, being capable of use for floors, side walls, ceilings, exteriors, roofs and in the most varied ways. It can also be used as a supporting material for ordinary residence construction where the weight is not unusual upon it. It also can be applied as a facing to glass, stone, woods, steel and practically every other material used in construction work.

Having enumerated above some of the advantages and properties of the material or composition forming the subject matter of the present invention, the description of the details of its manufacture will now be undertaken.

The process used in the manufacture of the artificial stone, marble or composition comprises three parts as follows: (1) the preparation of the liquid binder; (2) the preparation of the bulk material; and (3) the mixing of the binder and the bulk material in the final process of molding and casting the stone These several processes are described separately in detail below 1. *Preparation of liquid binder.*—The first chemical used in the preparation of the liquid binder is magnesium chloride, which is mixed with water until it attains a specific gravity varying from 1.8 to 2.4 times denser than water. The exact reading of the hydrometer is determined by the weather conditions under which the material is being manufactured. When the weather is cold, the hydrometer reading should be high; when the weather is hot, the hydrometer reading should be low. For an average working temperature (70 degrees, F.) the hydrometer reading should be approximately 2.2.

The next material to be added in the making of the liquid binder is acetic acid, which is added to the magnesium chloride solution as above prepared in the ratio of one gallon of acid for each one hundred gallons of magnesium chloride solution. After the acid has been added to the magnesium chloride, the hydrometer reading will remain virtually unchanged. Under average working conditions the hydrometer should read 2.2 times denser than water.

The next step is to procure some powdered zinc sulphate, and mix with water so as to obtain a hydrometer reading of 2.1 times denser than water. When this density has been reached, the zinc sulphate should be mixed with the magnesium chloride and acetic acid solution in the ratio of one and three-eighths gallons of zinc sulphate to each one hundred gallons of magnesium chloride and acetic acid solution. When this final mixture has been made, the hydrometer reading should register from 1.8 to 2.4, depending upon the weather conditions aforesaid.

The mixture forms the chemical binder for the bulk material, and has the advantage that it can be shipped in any ordinary liquid container without danger of evaporation freezing or explosion. It is a very fire resistant material, and can be applied on wood or other materials so as to make them highly fire resistant. The binder can be used immediately after mixing, although it is better after it is allowed to stand for at least twenty-four hours after the elements have been combined.

2. *Preparation of bulk material.*—The first material used in the manufacture of the bulk material is ordinary wood shavings and/or sawdust. The shavings or sawdust should be from pine or some other soft wood, such as cedar, cypress, or hemlock; and the sawdust should be of a very fine variety. Cork dust may replace in whole or in part the wood shavings or sawdust when it is desired to lessen the weight of the final product. This material serves as a binder for the clay material which is used in connection with it, as hereafter described. If the stone desired is to be of an extremely fine texture, the amount of shavings is reduced or even eliminated and the proportion of sawdust is increased; and if a coarser texture material is desired, the proportions are reversed. The percentage of sawdust and/or shavings used in the preparation of the bulk material is approximately 40% of the total quantity of bulk material.

With the shavings and/or sawdust is next added a quantity of pulverized infusorial earth. The amount of this infusorial earth should be 10% of the total quantity of bulk material. In lieu of infusorial earth, any form of fine clay or diatomaceous earth may be used.

To the bulk material is next added caustic calcined magnesite to the amount of about 48% of the bulk material. If a highly fire resistant material is desired, a pulverized form of asbestos may be used to the extent of 5% of the total quantity of the bulk material; in which event the amount of calcined magnesite used is reduced proportionately.

To the foregoing bulk materials is added a small quantity of color material such as ochre, coal dust, ashes, soot, or similar material, depending upon the color desired. The most beautiful and varied colors can be obtained by regulating the amount and kind of coloring used.

To make the mixture thoroughly waterproof, there should be added about 1½ gallons of boiling wax, such as paraffin, to every one hundred pounds of the material; which wax in a molten state should be added while the material is still turning in the mixer or agitator.

All the foregoing materials used in the preparation of the bulk material should be thoroughly mixed while in a dry state. The mixing can be done by hand but is preferably accomplished by a mechanical agitator.

The bulk material may also be formed from a mixture comprising asbestos, powdered cork, calcined magnesite, wood flour and powdered aluminum silicate.

3. *Mixing and molding.*—After the liquid binder and bulk material has been prepared as above, the composition is formed by adding to the bulk material enough of the liquid binder to thoroughly wet the bulk material. Under average conditions about one gallon of liquid binder should be used to eight to ten pounds of bulk material. After the mixing, the material is ready to be poured into the desired moulds, which can take any form desired whether flat work or the most artistic frescoes or ornamental designs.

The moulds should be well greased with some form of paraffin or other wax to prevent sticking. The material should then be poured into them and allowed to stand for about twenty-four hours, when it will be dry enough, under average conditions, to be taken out of the moulds. The material should be allowed to remain in a drying room (which need not be heated above 75° F.) for several days in order to obtain the best results, although this is not imperative; since the material after twenty-four hours or even twelve hours in the drying room is sufficiently hardened and dried to permit of commercial use.

If an extraordinarily compact and close grained material is desired, the ingredients may be placed under hydraulic pressure after being poured into the moulds. In this case the density of the material can be greatly increased, so as to render it suitable for exterior use and for use as supporting material.

4. *Bedding and pointing compound.*—As a bedding and pointing compound for use in setting the material, in filling nail holes, joints, etc., the liquid binder, and the bulk material may be shipped in separate containers to the job, where the same can be mixed and applied as needed, using one gallon of binder to approximately ten pounds of bulk material. The pointing compound will adhere to brick, stone, cement, glass, iron, steel, etc.

Having described my invention, what I claim and desire to secure by Letters Patent is:

A composition of matter of the character described comprising the reaction product of magnesium oxide and a filler mixed with an aqueous acetic acid including liquid composition containing magnesium chloride and zinc sulphate in substantially the proportions that would result from mixing substantially 1⅜ gallons of substantially 2.1 specific gravity zinc sulphate solution with 100 gallons of 1.8 to 2.4 specific gravity magnesium chloride solution, the proportion of liquid composition being sufficient to wet the magnesium oxide.

In witness whereof I have hereunto set my hand.

LON EDWARD WELCH.